March 11, 1969   E. W. BLANDIN   3,432,235
MEANS FOR TRANSFERRING GRAPHIC MATERIAL
Filed Oct. 10, 1966   Sheet 1 of 2

Inventor:
Ernest W. Blandin
By Stevens, Lehner & Stevens
Attorneys.

Inventor:
Ernest W. Blandin
By Stevens, Lehrer & Stevens
Attorneys.

United States Patent Office 3,432,235
Patented Mar. 11, 1969

3,432,235
MEANS FOR TRANSFERRING GRAPHIC MATERIAL
Ernest W. Blandin, 1402 N. Bourland Ave., Peoria, Ill. 61606
Filed Oct. 10, 1966, Ser. No. 585,670
U.S. Cl. 355—84　　　　　　　　　　1 Claim
Int. Cl. G03b 27/10

ABSTRACT OF THE DISCLOSURE

A contact printer for transferring a particular view drawn on a transparent subject sheet to a selected place on a photographically sensitized sheet. A mask having a sight opening exposes the particular view desired and a transparent sheet having an array of divisions thereon is laid upon the mask. The joint movement of the mask and subject sheet registers the sight opening with a division defining the view to be reproduced. The transparent sheet is a grid of thick material with the divisions being outlines scored in the upper surface of the grid, with the outlines being effaced by their distance from the sensitized sheet and the light passing sidewise through the grid in order not to print on the sensitized sheet.

---

My invention relates to drawings made on sheets of tracing paper or cloth in drafting rooms and engineering offices, and bearing illustrations of products, pieces of equipment, and the like. The views on a sheet of this character usually relate to a single subject; and the sheet is filed away in a drawer with sheets on other subjects. From time to time sheets are withdrawn for reference to desired subjects. This may require the selection of illustrations or views from one or more subject sheets, such views to be transferred in a desired arrangement on a new sheet usable as a pattern or work sheet for a project in hand. One way to transfer the selected views is to trace them from a chosen subject sheet or sheets with ink on individual patches of tissue paper or tracing cloth, attach the patches to a temporary backing sheet in the desired arrangement, and print the prepared sheet in a copying machine in order to obtain a clean copy. The method just described is costly because it requires drafting work and time to reproduce the desired illustrations on the individual tracing patches; and the task is tedious because they must be arranged and attached with care to the temporary backing sheet. Also, the attaching medium on the latter may show undesirable and confusing marks when the sheet is printed.

A second and more expeditious method for transferring illustrations is to cut them out of the subject sheet, and use them like the patches in the previous example to procure the desired final print. However, this method multilates the subject sheet, and leaves it with views missing and never as neat as in the original form, even if the patches are returned to the subject sheet with adhesive tape. This method is also time-consuming, and may produce undesirable marks on the final print as in the previous case.

A third method for transferring the desired illustrations employs a set of stacked elements comprising a mask on top, the subject sheet—face-down in the middle—and a slow-acting photographically-sensitized sheet, with the sensitized coating on the upper side, on the bottom. The mask is made with an opening—preferably square—suitable to isolate a desired view on the subject sheet. When a number of views are selected for transfer to designated places on the sensitized sheet, the first step is to carefully outline the limiting positions for the views on the sensitized sheet to a size conforming with that of the opening in the mask, this operation requiring haste because of progressive deterioration of the sensitized coating on exposure. Also, the lines drawn must be heavy in order to be seen through the subject sheet. Finally, the hands must be dry, and care exercised that they avoid contact with the sensitized sheet. The mask is now adjusted to register with a chosen outline on the sensitized sheet. The resulting image is, therefore, not sharp. Also, the heavy outlines on the sensitized sheet will remain and present a difficult erasing problem if the sheet is desired to have a neat appearance. It is now apparent that the method just described reduces the quality of the sensitized sheet by preliminary exposure, creates an imperfect image, and requires the drawing and erasing of outlines.

In view of the disadvantages in the methods described above, the invention has for its objects to procure a transfer of desirable graphic material which leaves the subject sheet intact, isolates the desired views for reproduction without need of drafting, cutting or patching, procures a permanent film and final print of neat appearance, and portrays the desired arrangement of views without blemishes or tell-tale marks.

A better understanding of the invention may be gained by reference to the accompanying drawings, in which—

Figure 1:
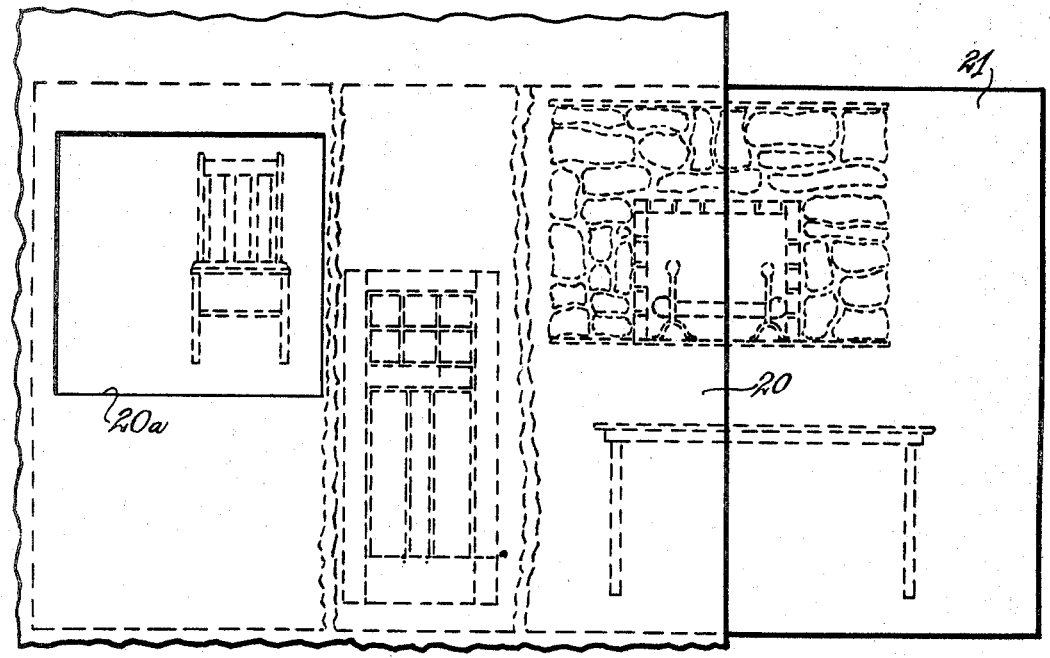
FIG. 1 is a fragmental view of a subject sheet face-down, with intermediate portions broken away and a subject view isolated for transfer purposes.

While the selection of the subject sheet is the initial step toward putting the present method into practice, the environment for such sheet or sheets is the essence of the invention, and will now be described. Accordingly, specific reference to the drawings indicates a baseboard 15 as the main support for a series of stacked components employed in connection with the subject sheet. Thus, the top component is a heat-insulating shield 17, the second one a grid 18, the third one a mask 20, the fourth one the subject sheet 21, the fifth one a photographically-sensitized transparency known as a sepia sheet 23, and the last component a pad 24 of foam rubber or similar resilient plastic material.

To describe the above components in greater particularity, the subject sheet is an original tracing done in India ink and of a transparent consistency; and it is of the usual size employed in the engineering or drafting establishment; and the baseboard 15 is made considerably larger in order to allow the subject sheet and other components above and beneath the same to be handled conveniently and be shifted without losing support. For the present purpose the subject sheet is positioned in a horizontal plane face down.

The sepia sheet 23 is positioned next underneath the subject sheet 21, and its light-sensitive coating is on the upper side. The resilient pad 24 is quite thin—about 1/16 inch—and black in color in order not to produce diffused light by reflection. The pad is firmly attached to the baseboard 15 by adhesive tapes (not shown).

Figure 2:
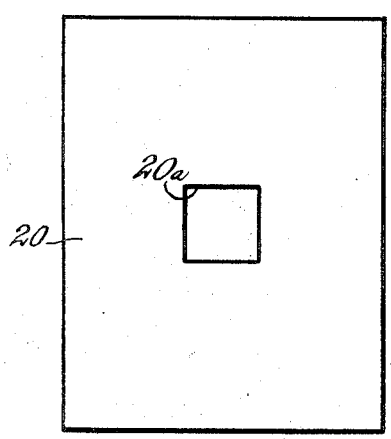
FIG. 2 is a plan view of a mask employed to isolate the view.

The invention entails the isolation of views selected from the subject sheet, for transfer to the sepia sheet. For this purpose the mask 20 is employed over the subject sheet, FIG. 2 showing that the mask has a sight opening 20a for light from above to pass through the subject sheet to the sensitive surface of the sepia sheet underneath; and the mask is moved to the place on the sepia sheet where the image so passed is to be located. In this manner transfers of chosen views from the subject sheet may be made on the sepia sheet by changing the position of the mask accordingly, with a light exposure at each location. When the exposures have been completed, the sepia sheet is developed by suitable treatment, such as by exposing it to ammonia vapors, so that it becomes a permanent transparency from which prints may be made. Since the sepia sheet shows a mirror or reverse image of the newly arranged views, it need only be turned over and placed in a copying machine to produce a positive print of the views. The print is the final product of the present process, and may be used as a guide for a new project or stored for future reference. Since the practice in conventional printing machines is to insert the subject sheet face-up, this can also be done in the present case to produce a positive image on the sepia sheet. However, the advantage in the use of the subject sheet face-down is that the ink lines of the views are in touch with the sensitive surface of the sepia sheet instead of transmitted through the subject sheet, with a sharper image on the sepia sheet as a result.

Figure 4:
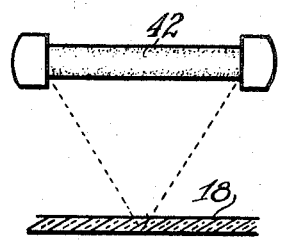
FIG. 4 is an elevation of a lamp used in relation to a fragment of the grid.

Important advantages are gained by the present process when the grid 18 is used in conjunction with the mask, subject sheet and sepia sheet. The grid is a plate of clear acrylic plastic laid directly over the mask 20 and made with smooth surfaces, such plastic having the quality of transmitting actinic rays of ultraviolet light for the most efficient treatment of the sepia sheet. The grid is scored with lines forming a pattern of squares of the size corresponding to the sight opening 20a in the mask 20. Thus, light cast on the grid will pass only through such sight opening and transmit the image of the view isolated therein to the sepia sheet. Ordinarily, the outline of the sight opening would also print on the sepia sheet. However, the grid is quite thick—such as ¼-inch—spacing its score lines so far above the sepia sheet that they are literally "burned out" and will cast no shadows on the sheet. Also, owing to the thickness of the grid, a considerable amount of light passes through it from the side, as noted in FIG. 4, tending to eclipse or blot out the shadows of the grid score lines.

In the application of each subject sheet view to the grid 18, the first concern is to place the view under a specific area of the grid. Then the mask is inserted between the subject sheet and the grid, and the view framed with the mask 20 by aligning the latter carefully with the grid lines. Usually, the precise position of the chosen view is not as important as that of the mask, because carelessly positioning the latter will show if any sensitive sheet surface along the margin fails to be exposed. In other words, the object of the grid lines is to set the mask precisely after the view is confined in the selected grid square.

Figure 5:
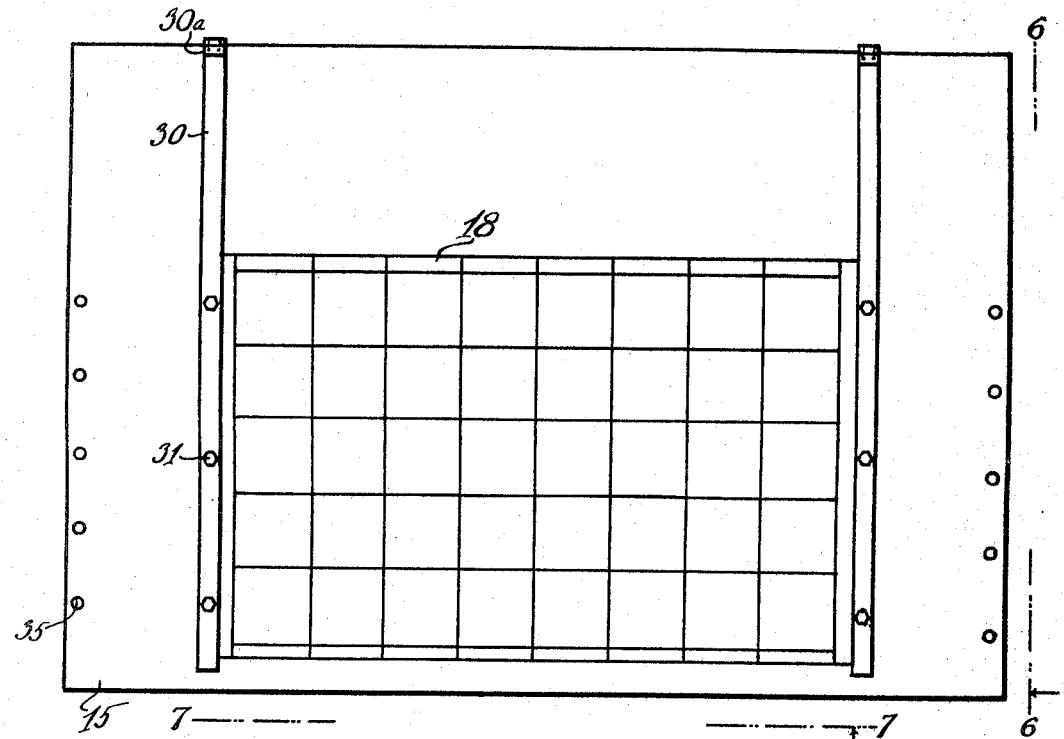
FIG. 5 is a plan view of an assembly employed to put the present method into practice.

The components described above are assembled as illustrated in FIGS. 5 and 6. Thus, the baseboard 15, pad 24, sepia sheet 23, subject sheet 21, mask 20 and grid 18 occur in upward sequence. The grid being of a firm nature is preferably applied to the baseboard in the manner of a hinged cover, shown open in FIG. 6 for the convenient insertion and removal of sheets underneath. FIG. 5 shows that the grid is situated over the forepart of the baseboard, and is extended laterally beyond the area of score line squares to receive a pair of supporting bars 30, these being secured to the grid by bolts 31. At the rear the bars are extended and hinged to the baseboard as indicated at 30a. When the grid is closed with pressure on a set of sheets positioned between it and the pad 24, the subject and sepia sheets become pressed together tightly, placing the graphic material on the bottom side of the subject sheet in full contact with the sensitive surface of the sepia sheet. However, these components do not receive downpressure in the region of the sight opening 20a of the mask 20. Therefore, the resilient material of the pad 24 rises in this region to press the sepia sheet upwardly against the subject sheet, and the latter against the grid, securing intimacy of the components in the region of light passage and accuracy in the transfer of the graphic image to the sepia sheet.

FIG. 1 is designed to illustrate the position of the mask 20 when a desired view is isolated in the sight opening 20a. Since the subject sheet is wider than the mask, and would be much wider if not shown broken away and gathered, it follows that the mask must be supplemented by another sheet of black pasteboard or similar material wherever the sepia sheet occurs, in order that the light may not print graphic material other than the isolated view on it, or affect the sensitive coating by passing through blank portions of the subject sheet. Also, where a horizontal series of views on the subject sheet are desired transferred without change to a position on the sepia sheet, the mask may be composed of two sheets separated only along the series of views. It may now be mentioned that the grid, mask and sepia sheet are of a size commensurate with that of standard subject sheets, and that the baseboard is larger than these at the sides and rear in order to allow handling or shifting of the mask to re-arrange views on the sepia sheet without loss of control or support.

Figure 6:
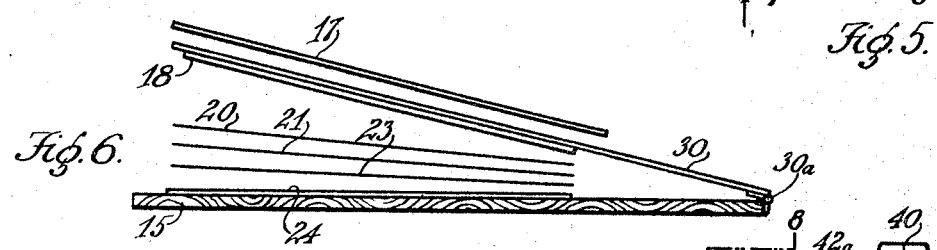
FIG. 6 is a section on the line 6—6 of FIG. 5 showing the order of components involved in producing the desired final print.
Figure 7:
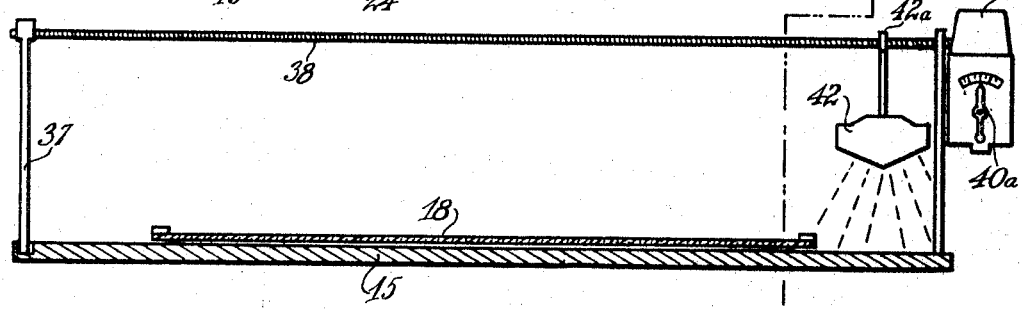
FIG. 7 is a section on the line 7—7 of FIG. 5 showing the application of a uniform lighting accessory.
Figure 8:
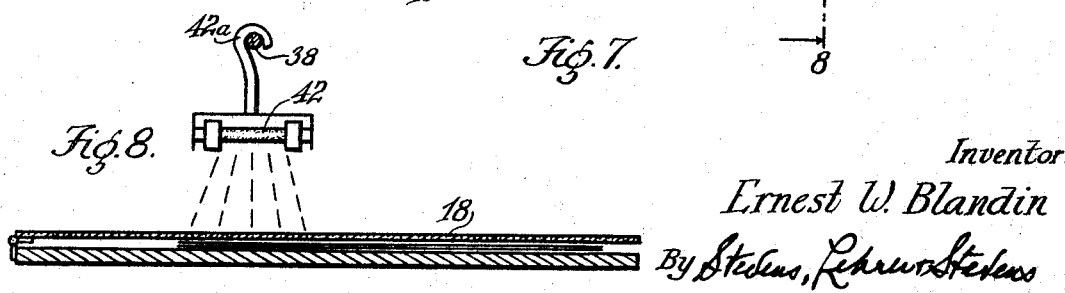
FIG. 8 is a section on the line 8—8 of FIG. 7.

The application of light for the transfer of images as stated is illustrated in FIGS. 5 to 7. Thus, the baseboard is recessed with a series of sockets 35 near the side edges for the erection of pairs of posts 37 as seen in FIG. 7. These journal a long screw 38 designed to cover the transfer area from side to side; and one of the posts carries a power unit 40 to operate the screw 38, with a suitable variable speed control 40a. A lamp 42 is suspended from the screw by means of a follower hook 42a pointed to seat in the thread groove of the screw. The speed of the lamp is of course geared to the slow reaction of the sensitive coating on the sepia sheet, and the lamp is of the ultraviolet type known to emit rays of actinic light most effective for the purpose in hand. The placement of the sockets need not be even, as it may be desirable in some cases for the lamp to travel in a slanted course for lighting areas out of line with the normal transverse travel of the lamp. Since the application of light strong enough for effective printing may generate heat injurious to the sensitive coating on the sepia sheet the top sheet 17 is applicable as shown in FIG. 6 to serve as a heat shield. The latter will of course have an opening over the sight opening 20a of the mask 20 for the passage of light to the component assembly underneath. The opening in the shield should be slightly larger than the sight opening 20a of the mask in order not to obstruct the edges of the area being exposed.

Figure 3:
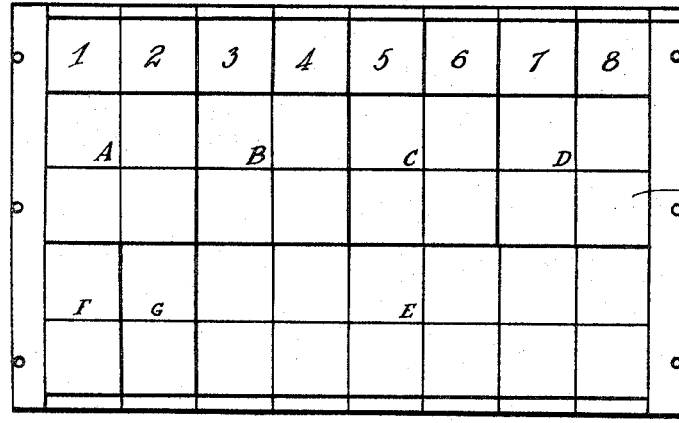
FIG. 3 is a plan view of a grid employed as a layout guide for defining the view and establishing its transferred position.

In planning a transfer of graphic material by means of the method described, it is best to prepare an outline of the work in prospect. Thus, one should start with a sketch representing the grid and how its spaces should be utilized. In other words, the sketch should indicate the identity of the selected views and the new arrangement or placement of the same to produce the desired work sheet. One grid and mask are sufficient for serving subject sheets in a single selected unit; and FIG. 3 illustrates a typical sketch usable when a transfer of graphic material is contemplated. Thus, units of single squares are designated in a horizontal row by a progression of numerals; a set of larger squares in a second row are designated by letters A to D, and a succession of vertical rectangles F and G and a large horizontal rectangle E arranged in a bottom row. It is apparent that the application of these squares and rectangles may be identified for the transfer of selected views through sight openings of corresponding size and form from a subject sheet in various sequences and arrangements.

It will now be apparent that the method and components described above make it easy to transfer selected graphic units or views in a desired order and placement on a final print usable as a guide for a new project or to reproduce further copies at a future time, all without the need of copying or mutilating the subject sheet. Also, by using the novel grid it is not necessary to draw outlines on the sepia sheet, which may be indistinct in places and involve a time factor in exposing the coating on the sepia sheet to deterioration. Also, when the sepia sheet has been developed, no unwanted guide lines or blemishes will remain and require removing. Further, the desired outlines already occur on the grid, and the desired square therein may be easily selected, so that the mask opening may be readily registered with the chosen square. The view is thus positioned accurately; and the grid lines produce no recorded shadows on the sepia sheet. On the subject of grid lines, it is also possible to employ a grid in which the squares are formed by corner points instead of lines. Further, the grid spaces permit close grouping of many views on one sepia sheet; and the weight of the grid holds the components under it in contact. The grid also serves as a backing in the zone of the sight opening, insuring good definition of the transferred views on the sepia sheet. The transfer process can thus be handled with dispatch, and enables a permanent transparency to be procured, and a final print made which is neat and on white paper, permitting additional sketches or notations to be made thereon if room exists.

I claim:

1. An apparatus for transferring a view drawn on a transparent subject sheet to a selected place on a photographically-sensitized sheet, comprising a mask laid on the subject sheet and having a sight opening exposing said view, and transparent means laid on the mask having an array of divisions each similar to said sight opening, the joint movement of the mask and subject sheet to register the sight opening with a division defining said place exposing the sensitized sheet area in the latter to reproduce the view, said transparent means being a grid of thick material, said divisions being outlines scored in the upper surface of the grid, and said outlines being effected by their distance from the sensitized sheet and the light passing sidewise through the grid in order not to print on the sensitized sheet.

References Cited

UNITED STATES PATENTS

| 2,545,964 | 3/1952 | Maxwell | 88—24 |
| 2,825,142 | 3/1958 | Johnson | 95—73 |
| 2,936,671 | 5/1960 | Saunders | 88—24 |

NORTON ANSHER, *Primary Examiner.*

CHARLES B. FUNK, *Assistant Examiner.*